Dec. 21, 1926.
H. W. SANFORD
LUBRICATING APPARATUS
Original Filed June 14, 1922   3 Sheets-Sheet 1
1,611,241
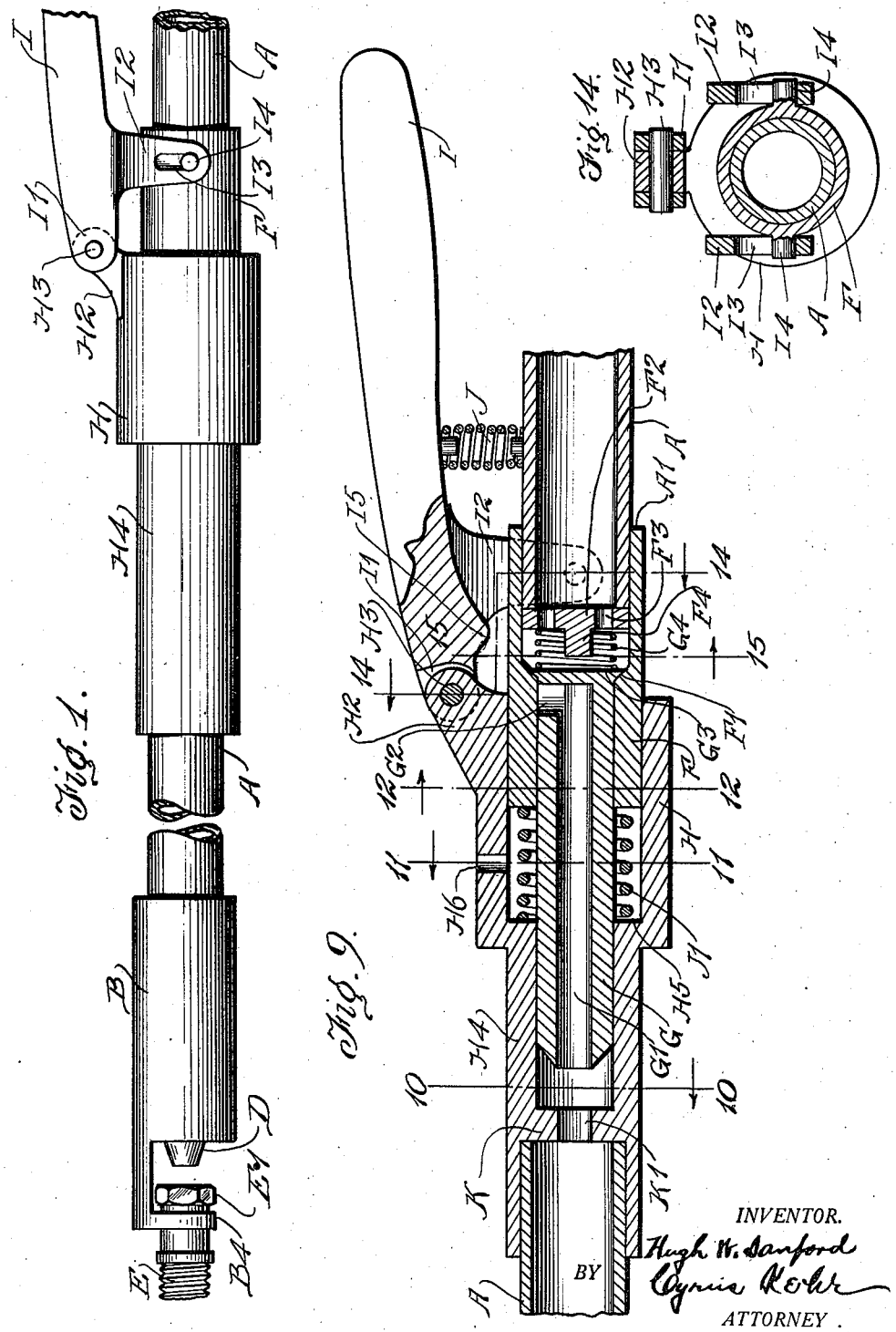
INVENTOR.
Hugh W. Sanford
BY
ATTORNEY.

Dec. 21, 1926.
H. W. SANFORD
1,611,241
LUBRICATING APPARATUS
Original Filed June 14, 1922   3 Sheets-Sheet 2
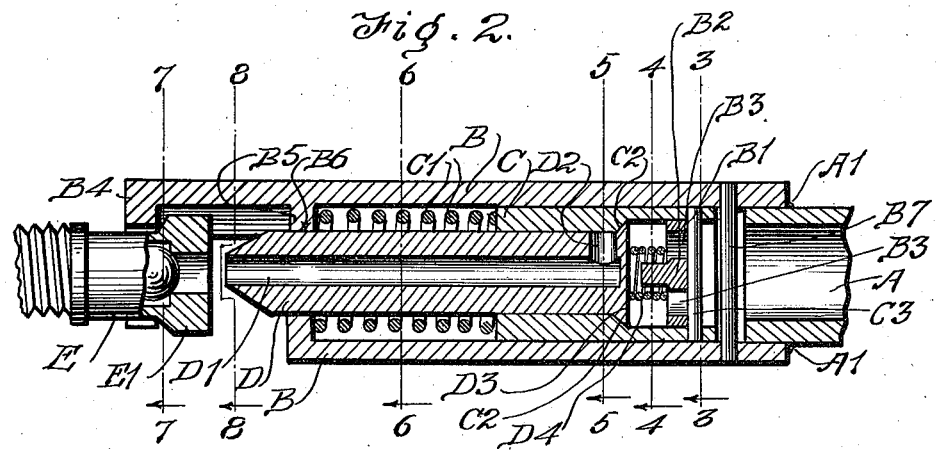
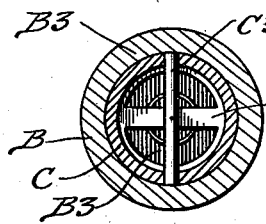
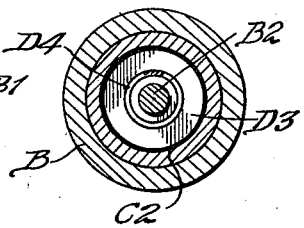
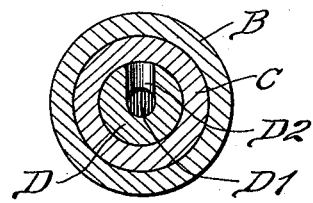
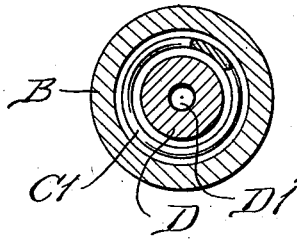
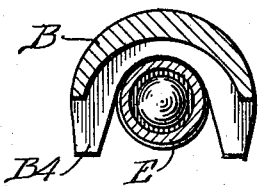
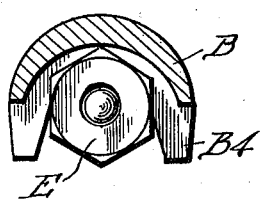
INVENTOR.
Hugh W. Sanford
BY
ATTORNEY.

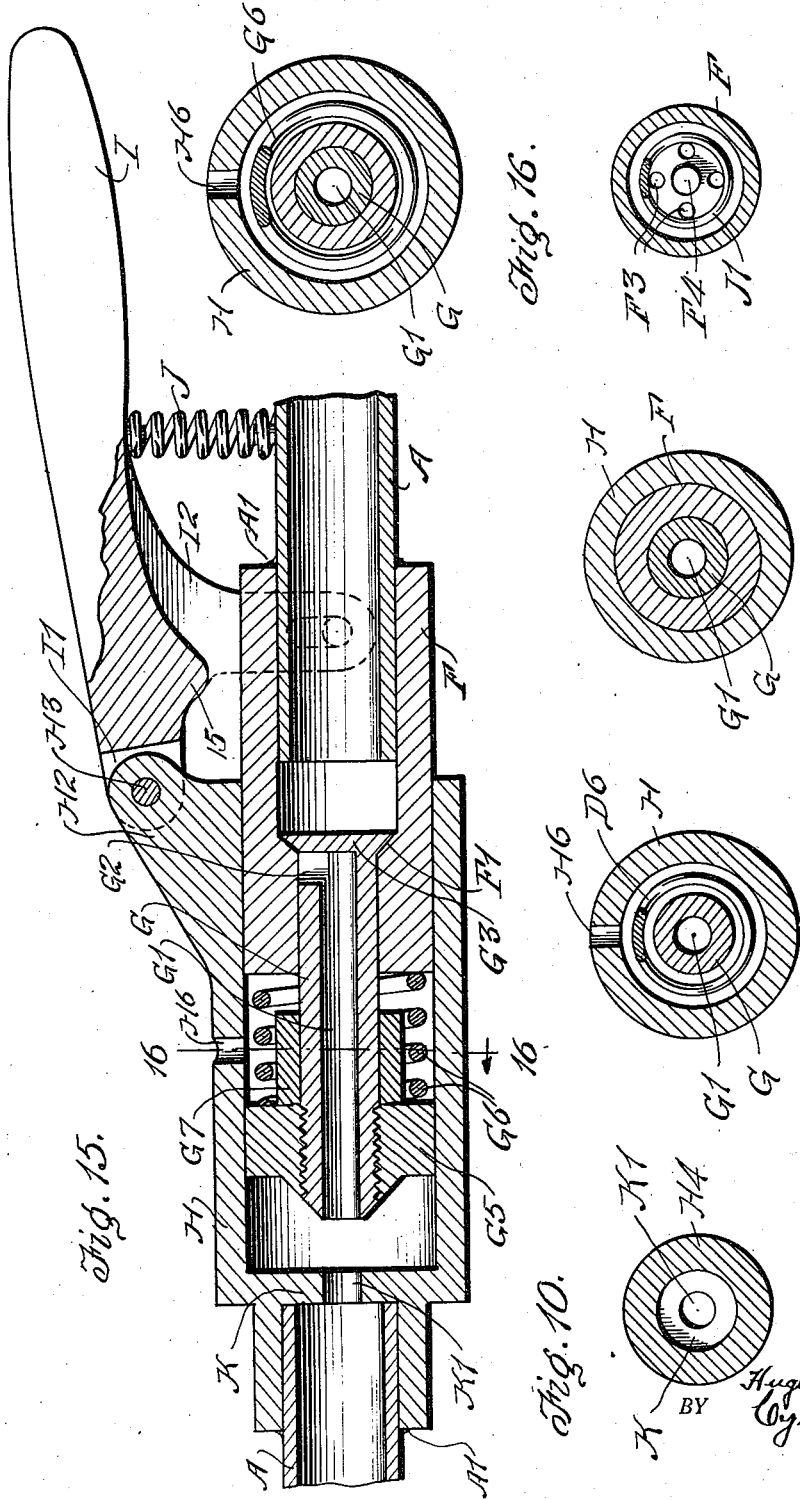

Patented Dec. 21, 1926.

1,611,241

UNITED STATES PATENT OFFICE.

HUGH W. SANFORD, OF KNOXVILLE, TENNESSEE.

LUBRICATING APPARATUS.

Original application filed June 14, 1922, Serial No. 568,220. Divided and this application filed November 9, 1925. Serial No. 67,892.

This improvement relates particularly to means for delivering grease from a grease gun or pump to a grease receiving member which communicates with the bearing or other structure which is to be lubricated. The invention comprises a transmission tube and means on the discharge end of the tube for making connection with the grease receiving member and for controlling flow of grease through the transmission tube.

This application is a division of my application, Serial No. 568,220, filed June 14, 1922, and relates more particularly to the second group of grease flow controlling mechanism, hereinafter mentioned.

The object of the invention is to provide such an apparatus in a form adapted for connection in relation with grease receiving members which are in positions difficult to reach or offering small space for access to the receiving members. To this end, the mechanism for controlling the flow of the grease through the transmission tube comprises two groups, one group being placed at the discharge end of the transmission tube and the other group being placed on the transmission tube at a suitable distance from the discharge end of the tube, the group of the mechanism at the discharge end of the tube being made small and of such construction as will adapt it to access and connection in relation with grease receiving members in various difficult positions. The part of the mechanism at the discharge end of the transmission tube is constructed for automatic action, while the other part of the mechanism is constructed for partial manual working. In operation, the first part or group of the controlling mechanism is put into position at the grease receiving member; then a handle forming a part of the second group of mechanism is moved to cause the moving of members for the opening of a valve passage in said group to permit forward flow of grease through the transmission tube. Such flow then exerts such pressure upon the forward group of devices as will cause engagement with the grease receiving member and also effect a valve opening in said group to allow the passing of grease into the receiving member. Such flow will continue until parts of the second group of mechanism are shifted for again cutting off the flow of grease through said group. In the form of the mechanism shown by the drawings, such movement effects backward pressure in the transmission tube toward the grease pump, whereby grease pressure on members of the forward mechanism is reduced. Such reduction facilitates the automatic restoring of the parts of the forward mechanism to their rest position for release of the mechanism from the receiving member and for again cutting off or closing the grease passage in said parts. It is intended that the back pressure thus exerted by the second group of mechanism shall create in the tube between the two groups such partial vacuum as will materially assist in the release of the first group from the grease receiving member.

In the accompanying drawings,

Fig. 1 is an elevation illustrating my improved apparatus;

Fig. 2 is a longitudinal section of a part of the controlling mechanism at the discharge end of the transmission tube;

Fig. 3 is a transverse section on the line, 3—3, of Fig. 2, looking toward the left;

Fig. 4 is a transverse section on the line, 4—4, of Fig. 2, looking toward the left;

Fig. 5 is a transverse section on the line, 5—5, of Fig. 2, looking toward the left;

Fig. 6 is a transverse section on the line, 6—6, of Fig. 2, looking toward the left;

Fig. 7 is a transverse section on the line, 7—7, of Fig. 2, looking toward the left;

Fig. 8 is a transverse section on the line, 8—8, of Fig. 2, looking toward the left;

Fig. 9 is a longitudinal section of the second or manual controlling device on the transmission tube;

Fig. 10 is a transverse section on the line, 10—10, of Fig. 9, looking toward the left;

Fig. 11 is a transverse section on the line, 11—11, of Fig. 9, looking toward the left;

Fig. 12 is a transverse section on the line, 12—12, of Fig. 9, looking toward the right;

Fig. 13 is a transverse section on the line, 13—13, of Fig. 9, looking toward the right;

Fig. 14 is a transverse section on the line, 14—14, of Fig. 9, looking toward the left;

Fig. 15 is a longitudinal section similar to Fig. 9, parts of the structure being of different form;

Fig. 16 is a transverse section on the line, 16—16, of Fig. 15, looking toward the left.

Referring first to Figures 1 to 8, inclusive, of the drawings, A is a transmission tube through which grease is driven toward the left by a grease gun. This tube may be the rigid discharge end of a hand grease pump or it may be a flexible tube connected with a hand grease pump or a power grease pump. Said tube, A, is fitted into one end of the tubular body, B, and immovably secured in said body, as by means of threading or solder, $A^1$. Immediately at the front of the tube, A, the body, B, has a fixed transverse cross-pin, $B^7$. At its forward end, the body, B, has a forked hook, $B^4$, which is adapted to extend to opposite sides of the tubular grease receiving member, E, having a head, $E^1$, the hook being forward of said head. Rearward of said hook, the body, B, has a forward transverse, fixed partition, $B^5$, which has on the axial line of the body, B, a circular opening, $B^6$.

Immediately forward of the cross-pin, $B^7$, is a sleeve, C, fitting slidably against the inner face of the wall of the body, B. Forward of said sleeve is an expanding coiled spring, $C^1$, of approximately the diameter of said sleeve and having its rear end bearing against said sleeve while its forward end bears against the partition, $B^5$, said partition constituting an abutment for said spring. The function of said spring is to hold the sleeve, C, yieldingly toward the cross-pin, $B^7$. Forward of the cross-pin, $B^7$, a cross-pin, $C^3$, has its ends seated in the walls of the sleeve, C. Immediately at the front of the cross-pin, $C^3$, is a partition, $B^1$, on the forward face of which is a central, forward-directed abutment, $B^2$. At opposite sides of said abutment, said partition has ports, $B^3$, for the forward passing of grease from the tube, A. Forward of the abutment, $B^2$, the interior of the sleeve, C, is contracted to form a slanting annular face, $C^2$.

A cylindrical nozzle or plunger, D, rests slidably in the sleeve, C, and in the opening, $B^6$, in the partition, $B^2$, the nozzle fitting so closely to the inner face of the sleeve, C, as to prevent the passing of the grease between the sleeve and the nozzle. The rear end of the nozzle is expanded to form a head, $D^3$, which seats on the slanting face, $C^2$, of the inner sleeve. When the nozzle moves rearward, said head bears against the abutment, $B^2$, whereby the rearward movement of the nozzle is arrested. A spring, $D^4$, surrounds the abutment, $B^2$, and bears against the head, $D^3$, and the partition, $B^1$. From its forward end rearward to the head, D, the nozzle has a bore, $D^1$, extending along the axial line of the nozzle. Near the head, $D^3$, of the nozzle is a lateral or side admission port, $D^2$, which communicates with the bore, $D^1$, and is normally covered by the sleeve, C, the head of the nozzle then resting against the slanting seat, $C^2$. Thus said sleeve constitutes an admission port covering member.

The forward end of the nozzle, D, may be of any desired form. In the drawing it is shown tapering to adapt it to enter the mouth of the receiving member, E.

The operation of this part or group of the mechanism is as follows:

The connection is to be applied as shown in Figs. 1 and 2 of the drawings, the hook, $B^4$, embracing the neck of the receiving member, E, below the head, $E^1$, of said member, and the nozzle, D, being opposite member and near the mouth or port of the receiving member. Grease pressure is now turned on through the transmission tube, A. The grease then passes through the ports, $B^3$, and against the head, $D^3$, of the nozzle, D, and against the rear end of the sleeve, C. Forward movement of the sleeve being resisted by the coiled spring, $C^1$, the nozzle and the sleeve are together driven forward, the head of the nozzle remaining seated until the forward end of the nozzle bears against the receiving member, E. The nozzle being now stationary, the sleeve, C, is driven forward as far as permitted by the spring. Such movement uncovers the port, $D^2$, in the nozzle, whereby a continuous passage is formed from the transmission tube, A, through the nozzle and into the receiving member, E.

If pressure is turned on in the transmission tube, A, when the connection is not applied to the receiving member, E, the grease pressure drives the nozzle and the sleeve, C, forward until the spring, $C^1$, is fully compressed. Then forward movement is arrested, the port, $D^2$, remaining covered by the sleeve, C. The coils in the spring are preferably of a number and thickness adapted to attain full compression shortly after the sleeve moves forward beyond the position needed for uncovering the port, $D^2$, when the nozzle seats on the receiving member. Since the port, $D^2$, thus remains covered when there is grease pressure during the absence of the receiving member, there can then be no discharge of grease through the connection, notwithstanding the grease pressure.

The group of mechanism illustrated by Figs. 9 to 14, inclusive, is associated with the connection above described for the purpose of controlling flow from a grease pump through the transmission tube, A, to the connection of Figs. 2 to 8, inclusive, above described. This controlling or cut off structure serves to permit or cut off flow of grease through the transmission tube; and when the movable parts of this second or controlling structure move into position to cut off or stop such flow, said parts effect a back pressure toward the pump, whereby there is created a suction or a partial vacuum in the part of the transmission tube forward of the second structure. By this means grease pressure in the connection illustrated by Figs. 2 to 8, inclusive, is so much reduced as to facilitate the return of the movable parts of said connection to their normal or rest positions by the expansion of the spring, $C^1$, of the connection.

In Figs. 9 to 14, inclusive, F is a cylindrical, fixed sleeve in alignment with the transmission tube, A, and having its right hand end surrounding and immovably secured to the part of the transmission tube which comes from the pump. Forward (toward the left) of the tube, A, the sleeve, F, is contracted internally to form an annular shoulder, $F^1$. Within the sleeve, at the inner end of the tube, A, is a cross partition, $F^2$, having at its middle a forward-directed lug, $F^4$. At each side of said lug the partition has a port, $F^3$.

In the forward or left hand part of the sleeve, F, is the rear part of a nozzle or plunger, G, slidable in the sleeve and having at its rear end a head, $G^3$, which is normally held against the annular shoulder, $F^1$, by the expanding coiled spring, $G^4$, one end of which is seated against said head and the other end of which is seated against the cross partition, $F^2$. Said spring may yield to allow the nozzle to move rearward relative to the sleeve until that movement is arrested by the head bearing against the lug, $F^4$.

An outer movable sleeve, H, slidably surrounds the fixed sleeve, F. The sleeve, H, is extended forward beyond the sleeve, F, and beyond an expanding coiled spring, $J^1$, which surrounds the nozzle, G. Then the sleeve, H, is contracted to form a neck, $H^1$, fitting slidably around the forward part of the nozzle, G. Thus a shoulder, $H^5$, is formed which constitutes an abutment for the forward end of the spring, $J^1$, the rear end of said spring bearing against the forward end of the sleeve, F. Said spring tends to press the sleeve, F, rearward and the sleeve, H, forward. Forward of the nozzle, G, the sleeve, H, has a cross partition, K, in which is a port, $K^1$. Forward of said partition, the contracted part or neck of the sleeve, H, surrounds the rear end of the forward section of the transmission tube, A.

The nozzle, G, has a bore, $G^1$, reaching from its forward end rearward to the head, $G^3$. A side admission port, $G^2$, extends from the rear end of said bore outward radially through the wall of the nozzle. When the head, $G^3$, of the nozzle is seated on the shoulder, $F^1$, of the inner sleeve, F, the port, $G^2$, is covered by the sleeve, F, so that grease can not pass from the tube, A, into the port, $G^2$. But when the nozzle is pushed rearward relative to the sleeve, F, the spring, $G^4$, becoming compressed, the head, $G^3$, of the nozzle becomes unseated. Thus the port, $G^2$, or a part thereof, becomes uncovered for the admission of grease through said port into the bore, $G^1$, of the nozzle. This rearward movement begins when the cross partition, K, bears against the forward end of the nozzle, as will appear further on.

At its rear, the sleeve, H, has an ear, $H^2$, extending rearward and outward and adapted to receive a pintle, $H^3$, which is tangential to a circle which is concentric to the fixed sleeve, F. A handle, I, at the rear of the ear, $H^2$, has ears, $I^1$, at opposite sides of the ear, $H^2$. The pintle, $H^3$, extends through said three ears and joins the handle to the outer sleeve, H. At the forward end of the handle, an arm, $I^2$, extends downward at each side of the fixed sleeve, F. Each of said arms has an upright slot, $I^3$, which receives a stud, $I^4$, fixed on the side of the fixed sleeve, F.

Between the ears, $I^2$, the handle has a shoulder, $I^5$, adapted to bear against the upper face of the inner sleeve, F, to limit forward movement of the outer sleeve, H. An expanding spring, J, is placed between the handle, I, and the transmission tube, A, and tends to lift the handle.

The operation of this part of the mechanism is as follows:

Normally the spring, $J^1$, holds the handle in the raised position for holding the sleeve, H, in its forward position, the head, $G^3$, resting on the shoulder, $F^1$. The lugs, $I^4$, serve as fulcra for the handle, I, and the shoulder, $I^5$, limits the forward movement by bearing against the outer face of the sleeve, F. When the outer sleeve, H, is thus in its forward position, the partition, K, and the forward end of the nozzle, G, are separated. Now the hand of the operator presses the handle, I, toward the transmission tube, A, against the resistance of the spring, J, the turning movement of the handle being on the axial line of the studs, $I^4$. This involves the rearward movement of the outer sleeve, H, until the partition, K, bears against the forward end of the nozzle and forces the nozzle rearward against the lug, $F^4$, for uncovering the admission port, $G^2$. Then the nozzle prevents further rearward movement of the outer sleeve. The wall, K, serves as an abutment for the forward end of the nozzle. Thus the admission port, $G^2$, is open and grease passes forward through said port and the nozzle and the port, $K^1$, in the partition, K, and through the forward section of the transmission tube, A, to the forward group of mechanism. There, as already described, the pressure of the grease automatically shifts the nozzle, D, and the sleeve, C, until said nozzle is arrested by the head, $E^1$, of the receiving member, E, and thereafter drives the sleeve, C, forward independently of the nozzle until the admission port, $D^2$, is open.

When the hand of the operator releases the handle, I, the springs, J and $J^1$, put the handle and the outer sleeve, H, through their reverse movement, whereby the partition, K, moves away from the forward end of the nozzle, B, thus leaving the nozzle free to move forward in the sleeve, F, by the forward pressure of the spring, G⁴, until the head, G³, of the nozzle is again seated on the inclined face, F¹, of the sleeve, F, whereby the side admission port, G², of the nozzle is again covered and the forward flow of grease is cut off. Relatively, the nozzle, G, and the inner sleeve, F, moves rearward within the outer sleeve, H. This tends to make vacant space or create partial vacuum in the forward part of the sleeve, H, whereby forward pressure of the grease against the head, D, and the inner sleeve, C, of the forward or connecting group of mechanisms is reduced, whereby rearward movement of the nozzle, D, and the inner sleeve, C, by the action of the spring, C¹, is facilitated, such rearward movement, as above described, causing the sleeve, C, to again cover the side admission port, D². The intensity of the vacuum action will depend upon the size of the parts in the second group and the distance the nozzle moves.

From the foregoing it will be seen that the forward or connecting group of mechanism is operated automatically through variation in grease pressure transmitted through the tube, A, and that the grease pressure is applied by the operator through the second group of mechanism. It will be observed that the forward or connecting group of mechanism is compact and adapted to reach into limited and difficult places for connection relative to a grease receiving member.

In Figs. 15 and 16, the structure is the same as in the preceding figures, excepting that the outer sleeve, H, is not contracted to form the neck, H⁴, and the shoulder, H⁵. On the contrary, said sleeve is extended forward with uniform diameter to the wall, K. The partition, F², and the spring, G⁴, are also omitted. The handle spring, J, is retained and is made strong enough to cause the shifting of the outer sleeve, H, independently of the spring, J¹, of Fig. 9.

As a substitute for the spring, G⁴, of Fig. 9, a spring, G⁶, is used to yieldingly hold the nozzle, G, in its forward position whereby the side admission port, G², is covered. A ring, G⁵, is threaded around the forward end of the nozzle and fits slidably in the outer sleeve, H. The spring, G⁶, surrounds the nozzle and a small sleeve, G⁷, the forward end of the spring bearing against the ring, G⁵, and the rear end of the spring bearing against the forward end of the inner sleeve, F.

When the handle, I, is depressed, the sleeve, H, moves rearward relative to the sleeve, F, until the partition, K, bears against the forward end of the nozzle, G. Then the movement of the sleeve, H, continues, the nozzle being carried with the sleeve, until the small sleeve, G⁷, bears against the ring, G⁵, and also against the forward end of the sleeve, F. Then the sleeve, H, and the nozzle move no further. The rearward movement made by the nozzle in the sleeve, F, has caused the unseating of the head, G³, from the shoulder, F¹, whereby the side admission port, G², has become uncovered. When the handle, I, is again released, the spring, J, reverses the position of the handle, whereby the sleeve, H, and the nozzle, G, are again pressed forward into their normal or rest positions, the head of the nozzle being seated and the forward end of the nozzle being separated from the partition, K.

In speaking of the movements of the sleeve, H, and the nozzle, G, it is to be understood that movement relative to the inner sleeve, F, is intended. For the sleeve, H, may be held stationary when the handle, I, is being depressed. In that case, the inner sleeve, F, and the forward end of the rear section of the transmission tube, A, and the nozzle, G, will be forced forward, until the forward end of the nozzle seats on the partition, K, and the lug, F⁴, seats on the head, G³, of the nozzle.

Vacuum action is produced when the nozzle and the partition, K, are moved from each other.

On comparing the connecting mechanism with the controlling mechanism, it will be seen that the connecting mechanism can be placed into a space too limited to receive the controlling mechanism with its handle and the hand of the operator.

This apparatus is specially adapted to be applied to a relatively long transmission tube leading from a power grease gun or pump.

I claim as my invention,

1. In an apparatus of the kind described, the combination with a transmission tube, of a controlling mechanism comprising a slidable nozzle having a side port, a member normally covering said port, an abutment located in front of the nozzle, said abutment and the nozzle and the covering member being relatively movable for making engagement between the abutment and the nozzle and for moving said covering member to uncover said port, substantially as described.

2. In an apparatus of the kind described, the combination with a transmission tube, of a controlling mechanism on said tube, the controlling mechanism comprising two telescoping sleeves in line with the tube, the forward one of said sleeves being attached to the adjacent end of the forward section of said tube and the rear one of said sleeves being attached to the adjacent end of the rear section of said tube, and a valve member slidable in said sleeves and adapted to seat in the rear sleeve when in its forward position in the rear sleeve and the valve member and the forward sleeve being formed for inter-engagement during forward movement of the rear sleeve whereby the valve member is unseated, and means for moving the rear sleeve forward and rearward relative to the forward sleeve, such rearward movement tending to create a vacuum in the controlling mechanism, substantially as described.

3. In an apparatus of the kind described, the combination with a transmission tube, of a controlling mechanism on said tube, the controlling mechanism comprising two telescoping sleeves axially in line with the tube, the forward one of said sleeves being attached to the adjacent end of the forward section of said tube and the rear one of said sleeves being attached to the adjacent end of the rear section of said tube, and a valve member slidable in said sleeves and adapted to seat in the rear sleeve when in its forward position in the rear sleeve and the forward sleeve bearing means for limiting forward movement of the valve member during forward movement of the rear sleeve whereby the valve member is unseated, and means for moving the rear sleeve forward and rearward relative to the forward sleeve, such rearward movement tending to create a vacuum in the controlling mechanism, substantially as described.

4. In an apparatus of the kind described, the combination with a transmission tube, of a controlling mechanism on said tube, the controlling mechanism comprising two telescoping sleeves axially in line with the tube, the forward one of said sleeves being attached to the adjacent end of the forward section of said tube and the rear one of said sleeves being attached to the adjacent end of the rear section of said tube, and a nozzle-form valve member slidable in said sleeves and adapted to seat in the rear sleeve when in its forward position in the rear sleeve and the valve member and the forward sleeve being formed for inter-engagement during forward movement of the rear sleeve whereby the valve member is unseated, and means for moving the rear sleeve forward and rearward relative to the forward sleeve, such rearward movement tending to create a vacuum in the controlling mechanism, substantially as described.

5. In an apparatus of the kind described, the combination with a transmission tube, of a controlling mechanism on said tube, the controlling mechanism comprising two telescoping sleeves axially in line with the tube, the forward one of said sleeves being attached to the adjacent end of the forward section of said tube and the rear one of said sleeves being attached to the adjacent end of the rear section of said tube, and a nozzle-form valve member having a side port and slidable in said sleeves and adapted to seat in the rear sleeve when in its forward position in the rear sleeve and the valve member and the forward sleeve being formed for inter-engagement during forward movement of the rear sleeve whereby the valve member is unseated, and means for moving the rear sleeve forward and rearward relative to the forward sleeve, such rearward movement tending to create a vacuum in the controlling mechanism, substantially as described.

6. In an apparatus of the kind described, the combination with a transmission tube, of a controlling mechanism on said tube, the controlling mechanism comprising two telescoping sleeves axially in line with the tube, the forward one of said sleeves having an abutment for limiting the forward movement of the below-mentioned valve member and being attached to the adjacent end of the forward section of said tube and the rear one of said sleeves being attached to the adjacent end of the rear section of said tube, and a valve member slidable in said sleeves and adapted to seat in the rear sleeve when in its forward position in the rear sleeve and the valve member and the forward sleeve being formed for inter-engagement during forward movement of the rear sleeve whereby the valve member is unseated, and means for moving the rear sleeve forward and rearward relative to the forward sleeve, such rearward movement tending to create a vacuum in the controlling mechanism, substantially as described.

7. In an apparatus of the kind described, the combination with a transmission tube, of a controlling mechanism on said tube, the controlling mechanism comprising two telescoping sleeves axially in line with the tube, the forward one of said sleeves being attached to the adjacent end of the forward section of said tube and the rear one of said sleeves being attached to the adjacent end of the rear section of said tube, and a valve member slidable in said sleeves and adapted to seat in the rear sleeve when in its forward position in the rear sleeve and the valve member and the forward sleeve being formed for inter-engagement during forward movement of the rear sleeve whereby the valve member is unseated, means yieldingly resisting forward movement of the rear sleeve relative to the forward sleeve, and means for moving the rear sleeve forward and rearward relative to the forward sleeve, such rearward movement tending to create a vacuum in the controlling mechanism, substantially as described.

8. In an apparatus of the kind described, the combination with a transmission tube, of a controlling mechanism on said tube, the controlling mechanism comprising two telescoping sleeves axially in line with the tube, the forward one of said sleeves being attached to the adjacent end of the forward section of said tube and the rear one of said sleeves being attached to the adjacent end of the rear section of said tube, and a valve member slidable in said sleeves and adapted to seat in the rear sleeve when in its forward position in the rear sleeve and the valve member and the forward sleeve being formed for inter-engagement during forward movement of the rear sleeve whereby the valve member is unseated, means yieldingly resisting rearward movement of the valve member in the rear sleeve, and means for moving the rear sleeve forward and rearward relative to the forward sleeve, such rearward movement tending to create a vacuum in the controlling mechanism, substantially as described.

9. In an apparatus of the kind described, the combination with a transmission tube, of a controlling mechanism located on said tube between the ends of the tube, said controlling mechanism including three telescoping members, one of the outer of said telescoping members being joined to one section of said tube and the other of the outer of said telescoping members being joined to the other section of said tube and each of said members having a seat for limiting forward movement of the third telescoping member, and the third of said telescoping members being in the form of a tubular nozzle having at its rear end a port normally covered by one of the other telescoping members, a spring for yieldingly holding the nozzle-form telescoping member in its rest position whereby said port is covered, and means for moving said nozzle-form member and another of said telescoping members to uncover and again cover said port, substantially as described.

10. In an apparatus of the kind described, the combination with a transmission tube, of a controlling mechanism located on said tube between the ends of the tube, said controlling mechanism including three telescoping members, one of the outer of said telescoping members being joined to one section of said tube and the other of the outer of said telescoping members being joined to the other section of said tube and each of said members having a seat for limiting forward movement of the third telescoping member, and the third of said telescoping members being in the form of a tubular nozzle having at its rear end a port normally covered by one of the other telescoping members, a spring for yieldingly holding the nozzle-form telescoping member in its rest position whereby said port is covered, means for moving said nozzle-form member and another of said telescoping members to uncover and again cover said port, and means for limiting rearward movement of the nozzle-form telescoping member, substantially as described.

In testimony whereof I have signed my name, this 2nd day of November, in the year one thousand nine hundred and twenty-five.

HUGH W. SANFORD.